United States Patent [19]

Lane et al.

[11] Patent Number: 4,655,644
[45] Date of Patent: Apr. 7, 1987

[54] BINDER-INJECTING ROCKBOLT

[76] Inventors: William L. Lane, Box 373, Viburnum, Mo. 65566; Donald L. Lewis, 111 Birch St., Belgrade, Mo. 63622

[21] Appl. No.: 617,884

[22] Filed: Jun. 6, 1984

Related U.S. Application Data

[63] Continuation-in-part of Ser. No. 582,276, Feb. 22, 1984.

[51] Int. Cl.[4] .............................................. E21D 20/02
[52] U.S. Cl. ...................................... 405/260; 411/44
[58] Field of Search ............... 405/259, 260, 261, 262; 411/44, 57

[56] References Cited

U.S. PATENT DOCUMENTS

| | | | |
|---|---|---|---|
| 2,092,341 | 9/1937 | De Vries | 72/105 |
| 2,287,395 | 6/1942 | Reynolds | 411/23 |
| 2,849,866 | 9/1958 | Flygare et al. | 405/261 |
| 2,950,602 | 8/1960 | Lang | 411/23 |
| 3,308,505 | 3/1967 | Fischer | 52/98 |
| 3,359,742 | 12/1967 | Blatter | 405/260 |
| 3,507,121 | 4/1970 | Morfeldt | 405/260 |
| 3,613,495 | 10/1971 | Podgursky | 411/19 |
| 4,000,623 | 1/1977 | Meardi | 405/260 |
| 4,055,051 | 10/1977 | Finney | 405/261 |
| 4,098,166 | 7/1978 | Lang | 411/23 |
| 4,158,519 | 6/1979 | Gamlin | 405/260 |
| 4,224,971 | 9/1980 | Muller et al. | 411/15 |
| 4,252,474 | 2/1981 | Botes | 405/260 X |
| 4,289,427 | 9/1981 | Rolston | 405/260 |
| 4,362,440 | 12/1982 | Glaesmann et al. | 405/269 |
| 4,386,876 | 6/1983 | Dupeuble | 405/260 |
| 4,461,600 | 7/1984 | Norkus et al. | 405/260 |
| 4,556,344 | 12/1985 | White | 405/261 |

OTHER PUBLICATIONS

Underground Excavations in Rock, by F. Hoek and E. T. Brown, pp. 333–342.
Celtite Resin Injection Systems (brochure).

Primary Examiner—David H. Corbin
Attorney, Agent, or Firm—Senniger, Powers, Leavitt and Roedel

[57] ABSTRACT

A rockbolt for installation in a bore in the roof of an underground excavation for supporting a roof, the rockbolt comprising a sleeve and a central member axially disposed and is extending substantially the length of the sleeve thereby defining an annular chamber in the sleeve. The sleeve at its lower end engages a faceplate which engages the roof. The upper end of the sleeve can be secured in the bore with an anchor, as is well known in the art. Ports in the lower end of the sleeve permit the separate introduction of separate components of a hardenable binder material, which mix as they pass up through the annular chamber. The binder is extruded out through ports in the upper end of the sleeve and travels downward filling the annular space between the sleeve and the bore. The binder hardens securing the central member and the sleeve in the bore.

12 Claims, 9 Drawing Figures

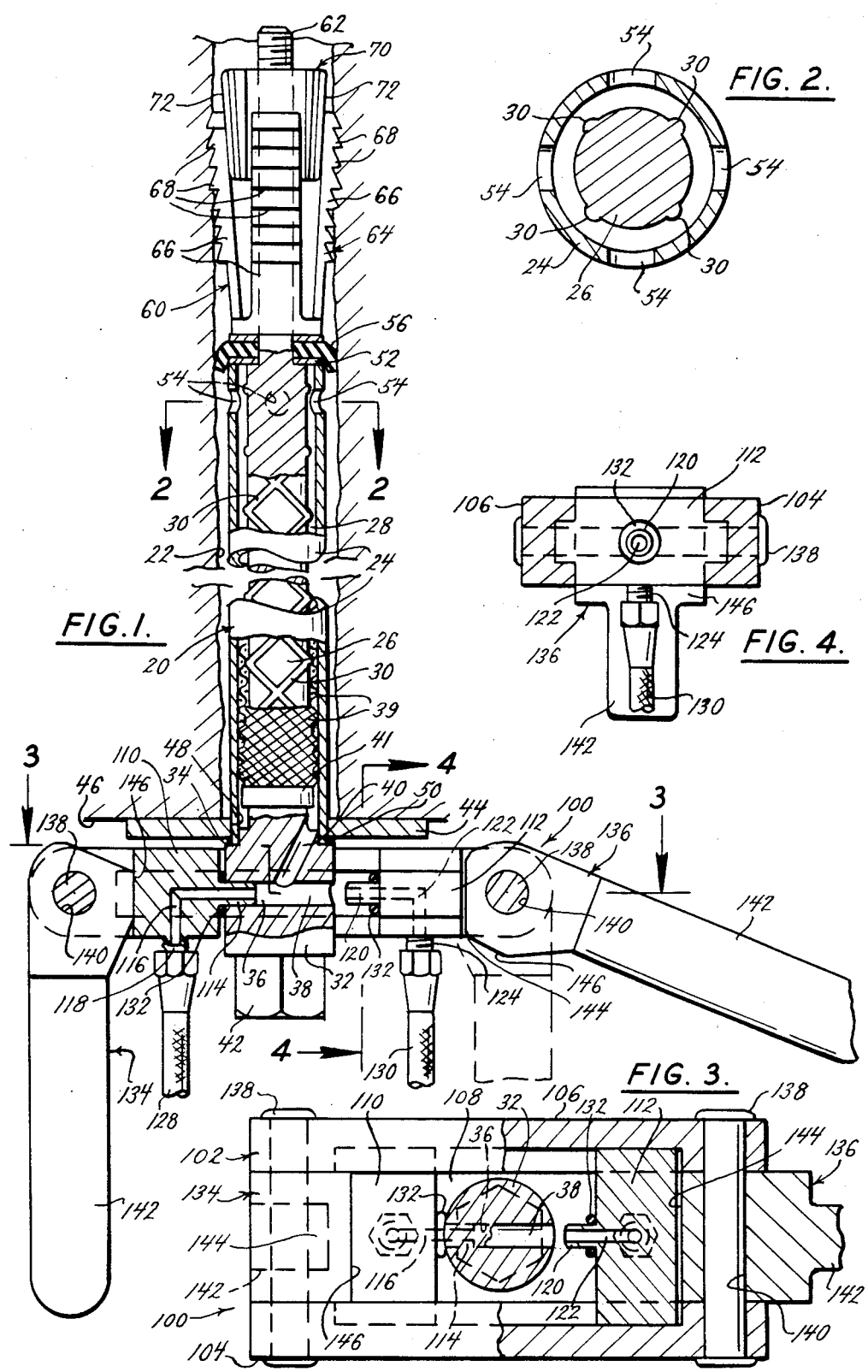

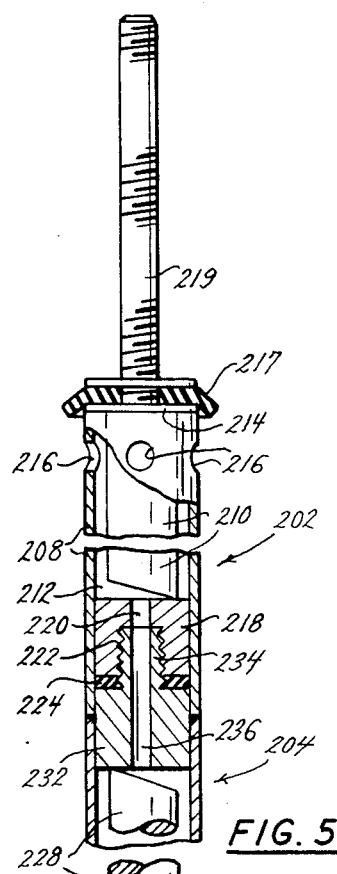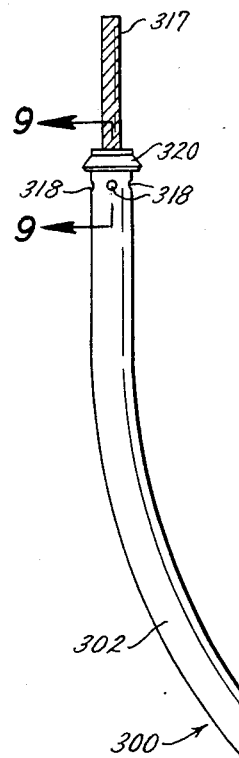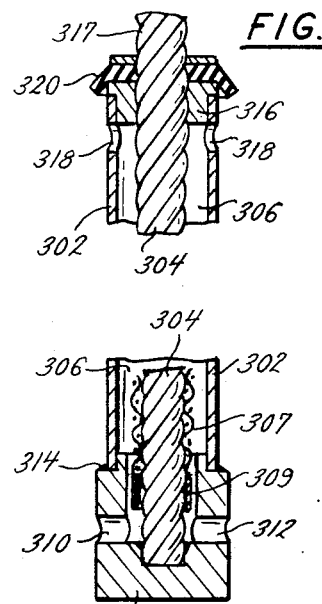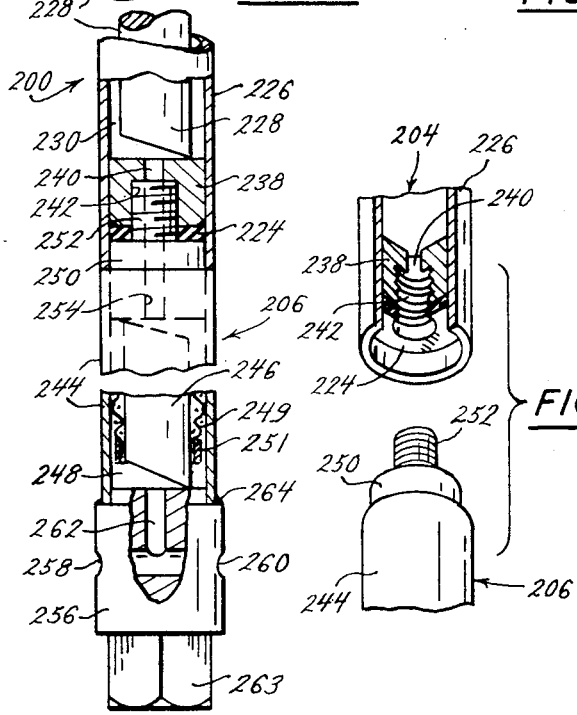

BINDER-INJECTING ROCKBOLT

BACKGROUND AND SUMMARY OF THE INVENTION

This application is a continuation-in-part of U.S. application Ser. No. 582,276, filed Feb. 22, 1984, entitled ROCKBOLT. This invention relates to roof bolts or rockbolts for supporting the roofs of underground excavations, such as tunnels or mines.

Rockbolts are long bolts used in the roof of an underground excavation for support. The upper end is secured in a bore in the roof, and the lower end engages a faceplate which engages the roof. Rockbolts are not usually used alone, but rather are arranged in a grid-like network in the area to be supported, normally spaced apart in two to four foot (60.96 to 121.92 cm.) intervals. Thus, in a twenty by thirty foot (6.096 by 9.144 meters) area it would not be uncommon to have sixty or more rockbolts.

There are two types of rockbolts: untensioned rockbolts which engage the bore along substantially the length of the bolt supporting the roof by engaging the overlying rock, and tensioned rockbolts which engage the rock at the upper end and at the lower end compress the surrounding rock. In the grid-like pattern in which the bolts are used, tensioned rockbolts create ribs of compressed rock across the roof span, which actually act like beams.

Rockbolts have been used for many years, during which time many types have been developed. A good description of prior rockbolts can be found in *Underground Excavations in Rock* by E. Hoek and E. T. Brown, incorporated herein by reference. The development of rockbolts is also discussed in our prior, copending application Ser. No. 582,276 filed Feb. 22, 1984, and incorporated herein by reference.

Various types of metal bolts which anchor by friction have been developed, but these bolts can be expensive to manufacture and difficult to install because the bore size was critical to proper engagement. The bolts could not be tensioned and they were subject to corrosion. A more recent version is an inflatable bolt comprising a collapsed tube inserted in the bore and inflated with high pressure fluid. However, expansion of the tube puts radial stress on the rock causing it to crack. This bolt can corrode, it is expensive, and it cannot be tensioned. The strength of the bolt is limited because its walls must be thin enough to flex.

Grout has been used to secure metal rods or wooden dowels in the bores, because it provides good engagement and protects metal rods from corrosion. However, large quantities of grout are needed or larger, more expensive rods are needed. Furthermore, the bore is usually longer than the rod, and as the rod is inserted, it pushes grout up into the dead space at the top of the bore. Grout is very messy and difficult to handle. It generally must be made at the site of use and near the time of use and extra personnel and special equipment are needed to handle the grout, even so large amounts of grout are wasted. Further, the grouted rods generally are not tensioned.

One type of grouted rockbolt, often called a perfobolt, consists of two perforated half tubes filled with grout, wired together and inserted in the bore. A rod is driven into the tube, extruding the grout through the perforations. Such a bolt was shown in Flygare, et al., U.S. Pat. No. 2,849,866, incorporated by reference herein. This type of bolt was time-consuming to install, and required special equipment, and could not be tensioned.

Recently, cartridges of hardenable resin and catalyst have been inserted into the bore and punctured and mixed by inserting and turning the rod. This achieves a very secure engagement, but large amounts of expensive resins are needed, especially in larger bores or where installing the rods pushes the resin into the dead space at the top of the bore. It is difficult to insert the cartridges and the rod into the bore and special equipment is often needed. It is also difficult to properly mix the resin, and bore size and rod size are critical to proper mixing. Adequate mixing also requires that the rod be rotated for an extended time, and quality can vary from bolt to bolt, ultimately depending upon the particular installer.

An example of a resined rockbolt is shown in Lang, U.S. Pat. No. 4,098,166, incorporated by reference herein. The Lang device has a specially designed rod and faceplate to facilitate the installation of the rod and the mixing of the resin.

In some rockbolts, binder is pumped in after the rods are installed through packing sealed in the mouth of the bore. Large quantities of expensive binder are needed, and air trapped in the top of the bore opposes the flow of binder and leaves air pockets which weaken the bolt. Further, the binder must be promptly used or it will set, jamming the equipment and wasting binder.

In another type of bolt, the binder is injected through a central injection tube reinforced by semi-cylindrical sections assembled about the tube as the tube is fed into the bore. The binder fills the annular space between the support sections and the bore walls and the column inside the sections. Large quantities of expensive binder are used, and the separate sections provide less structural strength than a solid member, and cannot be tensioned.

Tensioned rockbolts are generally preferred over the untensioned types and the first development in this area was a metal rod having a slotted upper end and a wedge disposed in the slot, the end was expanded and the rod tensioned. There was only a small contact area so the rod could slip, and bore length and diameter were critical to proper installation. Corrosion of the rod was also a problem. A mechanical anchor or expansion shell on the end of the rod replaced the wedge/slot mechanism, but these were more expensive, they still provided a relatively small contact area, and the problem of corrosion persisted. Mechanically anchored bolts were subject to loosening as the surrounding rock weakened under stress, and had to be periodically retensioned.

Some tensioned rockbolts were back-filled with grout after the rod was tensioned to achieve a more secure engagement in the bore and to reduce corrosion. The rod was installed along with tubes through which grout could be pumped. Sometimes cable is used instead of a rod. This bolt was expensive, special equipment was needed to make and handle the grout, correct installation required skilled labor, and the grout tubes were frequently broken during installation. Grout has also been used to anchor the rod end. Once the grout set, the rod could be tensioned. The problems of handling the grout, of broken grout lines, and of the need for skilled labor persisted.

Resin has also been used to anchor rockbolts. Fast setting resin cartridges are inserted in the bore, followed by slow setting resin cartridges and a rod is driven into the bore, bursting the cartridges. The faster setting resin sets at the top of the rod sets and anchors the rod so that it can be tensioned before the rest of the resin sets. With this system, a lot of expensive resin is required and special equipment is often needed to insert the cartridges and install the rod.

Applicants have previously developed a self-contained rockbolt comprising a sleeve with ports at its upper end and containing cartridges of a hardenable binder, such as resin or grout, and a plunger slideably disposed in the sleeve. This rockbolt is simply inserted into the bore and the plunger is operated, for example, with pressurized fluid to extrude the binder from the ports in the upper end of the sleeve. This rockbolt can be used as a tensioned or untensioned rockbolt. This rockbolt is the subject of applicants' co-pending application Ser. No. 582,276 titled ROCKBOLT filed Feb. 22, 1984.

Applicants' present invention is a binder-injecting rockbolt that utilizes bulk binder supplied to the rockbolt under pressure. The rockbolt comprises a sleeve having at least one port near its upper end, and a central member axially disposed, and extending substantially the length of, the sleeve. The central member defines an annular chamber in the sleeve, reducing the amount of binder required and acting as a structural member. At least one port is provided in the lower part of the sleeve for the introduction of binder under pressure.

The rockbolt is inserted into a bore in the roof of an underground excavation and connected to a source of binder under pressure. The binder travels up the annular chamber in the rockbolt, out the ports near the top, and down the annular space between the outside of the rockbolt and the bore wall. A seal on the rockbolt above the port prevents binder from traveling upward.

Several ports can be provided in the lower part of the sleeve to permit the separate introduction of components of the binder. Passage through the annular chamber provides mixing, which can be augumented by the provision of baffles, wire or plastic mesh, or similar structures in the chamber. By mixing the binder in the rockbolt, the difficulty and expense of dealing with binders is substantially reduced, and there is no wasted binder.

The rockbolt of this invention can be constructed in sections with a top section having an outlet port and a base section with inlet ports. Each section comprises a sleeve and a central member defining an annular chamber in the sleeve, and mating connectors for joining the sections in such a way that the annular chambers of the sections communicate. One or more extenders can be interposed between the top and base to increase the length of the bolt. The rockbolt can be assembled section by section as it is installed into the bore. Thus, rockbolts can easily be made to 20 or 30 feet (6.096 or 9.144 meters) in length, and perhaps longer, but these long rockbolts can be conveniently manufactured, shaped, and stored in sections. The sectioned bolts permit the installation of long bolts in locations where small floor to ceiling dimensions would not normally permit. This is far superior to the prior art where loose dowels were inserted into the bore and back-filled with binder. The unconnected dowels provide little structural strength. To fill the bore first required special equipment. Applicants' sectional rockbolt solves these problems by providing a long, structurally intact rockbolt that fills the bore from the back with binder from the top of the bolt, while reducing or eliminating many of the problems of dealing with binders.

Applicants' new rockbolt can be made flexible for installation in locations with small clearance between the floor and the roof. Because the rockbolt can bend, it can be longer than the clearance between the floor and the roof. The flexible rockbolt is easier to store and ship.

Applicants' new binder-injecting rockbolt can also be used as a tensioned rockbolt by providing a mechanical anchor on the top of the sleeve to engage the top of the bolt in the bore so that the bolt can be tensioned.

The binder-injecting rockbolt combines the most desirable features of the prior rockbolts providing a tensionable rockbolt engaged in the surrounding rock substantially along its length and encased in a binder. Installation is extremely fast and can be accomplished by just one worker. Because of the simple structure, the rockbolt is relatively easy and inexpensive to manufacture. The same basic structure is easily adapted to a variety of rockbolts—both tensioned and untensioned.

The extrusion of binder results in a tensioned or untensioned rockbolt bonded along its length in the bore. Applicants' rockbolt is securely engaged without radial stressing and cracking of the surrounding rock experienced with prior expanding rockbolts. The binder prevents corrosion of the rockbolt. The binder also prevents the tensioned rockbolts from loosening, eliminating the need for periodic retensioning. Finally, the binder provides a means for verifying the proper installation of the rockbolt, since when binder appears at the face plate it indicates that the rockbolt is completely encased in binder.

The depth of the bore is not as critical as it was to some prior grouted or resin rockbolts. The bore can be over drilled without the problem of pushing binder into the dead space above the rockbolt. Nor is the bore size or bolt size critical for proper mixing of component binders as it was for some prior rockbolts. The binder is mixed as it passes through the annular chamber and/or a separate mixing unit so the size of the annulus between the bolt and bore is not important to proper mixing. The rockbolt has both a sleeve and a central member, both of which are secured in the bore with the hardenable binder. Thus the rockbolt provides two structural members: a sleeve and a central member and is stronger than most prior rockbolts. The binder-injecting rockbolt only uses binder to fill the annular chamber and the annulus between the bolt and bore. Thus the amount and expense of the binder is significantly reduced. Because of the reduction of the amount of binder used, more effective binders, for example, epoxy type or polyurethane type resins, previously too costly to be used, can be used, so even better engagement between the rockbolt and bore can be achieved than with prior rockbolts.

BRIEF DESCRIPTION OF THE DRAWINGS

FIG. 1 is a partial cross-sectional view of a rockbolt incorporating the invention with the middle portion omitted, and showing an installer unit;

FIG. 2 is a cross-sectional view of the rockbolt taken along the plane of line 2—2 in FIG. 1;

FIG. 3 is a cross-sectional view of the installer unit and rockbolt taken along the plane of line 3—3 in FIG. 1, showing the nipples for introducing binder material into the rockbolt;

FIG. 4 is a cross-sectional view of the installer unit taken along the plane of line 4—4 in FIG. 1, showing one nipple for introducing binder material into the rockbolt;

FIG. 5 is a partial cross-sectional view of a rockbolt incorporating the invention, constructed in sections;

FIG. 6 is a perspective view of the ends of two adjacent sections of the rockbolt of FIG. 5, with a portion broken away to show their engagement;

FIG. 7 is a side plane view of a flexible rockbolt incorporating the invention;

FIG. 8 is a cross-sectional view of the bottom of the rockbolt of FIG. 7, taken along the plane of line 8—8 in FIG. 7; and FIG. 9 is a cross-sectional view of the top of the rockbolt of FIG. 7, taken along the plane of line 9—9 in FIG. 7.

DETAILED DESCRIPTION OF THE PREFERRED EMBODIMENT

In FIG. 1, a first embodiment of a rockbolt incorporating the invention, indicated generally as 20, is shown as it would be installed in a bore 22 in the roof of an underground excavation such as a tunnel or mine. Rockbolt 20 comprises a generally cylindrical sleeve 24 preferably sized to closely conform to bore 22, and a generally cylindrical central member 26, axially disposed in, and extending substantially the length, of sleeve 24. Central member 26 thus defines an annular chamber 28 in sleeve 24. The external side and/or the internal side of sleeve 24 can be provided with a rough surface to facilitate engagement with the binder material. The roughened surface is particularly important when grout or polyester resins are used. One method of roughening these surfaces would be to push dimples into the exterior of the sleeve, creating depressions on the exterior surface and raised welts on the internal surface. Sleeve 24 is preferrably steel, but could be any suitable material, for instance plastic. Likewise, central member 26 is preferrably steel, but could also be made of wood or plastic. Central member 26 can also be hollow with closed ends to reduce weight and conserve material. It is desirable that the surface of central member 26 be uneven to facilitate mixing of the binder and to achieve secure engagement of the central member in the sleeve. The central member can be any elongated shape such as a spiral or helix and is here referred to generally as a cylinder. In the preferred embodiment central member 26 is generally cylindrical and has a plurality of raised ribs 30, but alternatively could have grooves or some other structure, or if a separate mixing unit is provided, central member 26 can be smooth.

The lower end of sleeve 24 is closed with end plug 32, joined to sleeve 24 as by welds 34. In the preferred embodiment end plug 32 has two opposing inlet ports 36 and 38, for the separate introduction of components of a hardenable binder into rockbolt 20. A two component resin/catalyst binder, such as a polyester or polyurethane or epoxy binder known and used with rockbolts is particularly suitable. Grout or cement can also be used, in which case the second component could be an accelerator, to reduce setting time. A separate mixing device is preferably provided in annular chamber 28 to ensure complete and early mixing of the binder. This mixing device can comprise a plastic or metal mesh 39 disposed in the lower port of chamber 28 and secured for example with a band 41 to central member 26. Ports 36 and 38 extend inwardly and communicate with passage 40 which communicates with annular chamber 28. The lower edge of end plug 32 has a depending knob 42 of square cross-section.

A face plate 44 engages the roof surface 46 and has a hole 48 through which sleeve 24 passes. Shoulder 50 formed at the juncture of sleeve 24 and end plug 32, engages face plate 44.

The upper end of sleeve 24 is closed with end plug 52. Four ports 54 are provided in sleeve 24, near the upper end. As shown in FIG. 2, ports 54 are equally spaced about the circumference of sleeve 24. A seal, such as dish-like seal 56 is mounted on sleeve 24 above ports 54. The rim of seal 56 protrudes sufficiently to contact the walls of bore 22 to prevent upward seepage of binder upon its extrusion from ports 54. Because of the dish-like shape of seal 56, upward pressure forces the edges against the walls of bore 22 achieving an effective seal.

To put rockbolt 20 in tension so it compresses the rock between its ends, the ends of rockbolt 20 must be engaged to the rock. The lower end of rockbolt 20 engages roof surface 46 via face plate 44. The upper end of rockbolt 20 can be engaged to the rock with any of the mechanical anchors well known in the art. One such anchor 60 is shown in FIG. 1, where a threaded stud 62 (optional) is shown extending from the top of end plug 52. Threaded stud 62 can be made one piece with central member 26, in which case the central member would extend through end cap 52. An expansion shell 64 is mounted over stud 62, and has four vertical fingers 66 which have a plurality of inclined teeth 68 on their exteriors. An expander member 70 is threaded onto stud 62, and has four downwardly tapering ramp surfaces 72 each engaged by the back of one of fingers 66. Teeth 68 on fingers 66 engage the walls of bore 22 and prevent turning of expansion shell 64 or expander member 70. Rotation of shell 62 by turning sleeve 24 draws expander knob 70 downward, opening expansion shell 64. Knob 42 on end 32 facilitates the turning of sleeve 24. Once expansion shell 64 is as fully expanded as bore 22 will allow, the expander member 70 can no longer move downward. Further rotation of sleeve 24 causes stud 62 to thread upwardly, tensioning rockbolt 20, whose lower end is engaged to roof face 46, via plate 44, and compressing the rock between the ends of the rockbolt.

Whether the rockbolt is tensioned or not hardenable binder is injected under pressure into annular chamber 28. The binder travels up annular chamber 28, out ports 54 and down in the annular space between sleeve 24 and bore 22. In the preferred embodiment the hardenable binder is introduced into sleeve 24 as separate, unmixed components through ports 36 and 38, which are mixed in annular chamber 28. This eliminates the problems of making and using binder experienced with prior art rockbolts, and eliminates the waste of mixed but unused binder. Of course premixed binder could be introduced into rockbolt 20, if desired.

The separate binder components can be introduced into rockbolt 20 as with installer unit 100, shown in FIGS. 1, 3, and 4. Installer unit 100 comprises a rectangular base 102 with a front face 104, a rear face 106, and a vertical central aperture 108 for receiving end plug 32 of rockbolt 20. Two blocks 110 and 112 are slideably mounted in base 102 on the left and right sides of aperture 108, respectively. Block 110 has a nipple 114 on the inside side connected to an L-shaped channel 116 that terminates in threaded knob 118 at the bottom of block 110. Likewise, block 112 has a nipple 120 on the inside side connected to an L-shaped channel 122 that terminates in threaded knob 124 at the bottom of block 112.

A hose 128 is threadly connected to knob 118, and leads to a source of a binder component under pressure. Such a source might be a pump as is known in the art. A hose 130 is threadly connected to knob 124, and leads to a source of a second binder component under pressure. An O-ring seal 132 is mounted over each of nipples 114 and 120.

Handles 134 and 136 are pivotally mounted at the left and right ends, respectively, of base 102. Handles 134 and 136 are each pivotally mounted with a pin 138 that extends through front face 104, through hole 140 in the top of each handle, and then through rear face 106. Each of handles 134 and 136 comprise a grip 142, a camming surface 144, and a locking face 146. As shown on the right side of FIG. 1, as grip 142 on handle 136 is operated downward, handle 136 pivots about pin 138 and camming surface 144 engages the outside side of block 112, pushing block 112 inward, toward rockbolt 20. Nipple 120 is pushed into port 38 of rockbolt 20, and seal 132 is flexible enough to allow camming surface 144 to travel over center so that locking face 146 can engage the block. This is shown on the left side of FIG. 1, where the locking face 146 of handle 134 engages block 110 and secures it against outward motion, even upon the introduction of binder material under pressure from nipple 114 into rockbolt 20.

Once nipple 114 is secured into port 36 and nipple 120 is secured into port 38, the sources of the binder components are actuated. The separate components enter separately through ports 36 and 38, then travel together through passage 40 into annular chamber 28. the components travel upwardly through annular chamber 28, ribs 30 on central member 26 augmenting the mixing of the components, and providing a more secure engagement with the binder. The binder travels out from ports 54, seal 56 prevents upward travel of the binder and the binder travels downward in the annular space between sleeve 24 and bore 22. The appearance of binder at the mouth of bore 24 indicates that the bolt has operated properly and is completely encased in the binder material. As the binder hardens it secures the rockbolt 20 in bore 22 and central member 26 in sleeve 24, ribs 30 facilitating the engagement of central member 26.

A second embodiment of the rockbolt is indicated generally as 200 in FIG. 5. Rockbolt 200 comprises a top section 202, and extension section 204, and a base section 206, which can be assembled as rockbolt 200 is inserted into bore 22.

Top section 202 comprises a generally cylindrical sleeve 208 and a generally cylindrical central member 210 axially disposed in and extending substantially the length of sleeve 208. Central member 210 thus defines an annular chamber 212 in sleeve 208. The upper end of sleeve 208 is closed with end plug 214. Four ports 216 are provided in sleeve 208, near the upper end and are equally spaced about the circumference. A seal such as dish-seal 217 is mounted on sleeve 208 above ports 216, and acts like seal 56 previously described. A threaded stud 219 may also be provided to support an anchor, like anchor 60, previously described. And, as also described above, stud 219 could be made integral with central member 210. The lower end of sleeve 208 is closed with end plug 218, positioned in sleeve 208 above the lower edge. End plug 218 has an axial passage 220 and a threaded aperture 222. A flat rubber seal 224, with a central hole is provided in sleeve 208, below end plug 218.

Extension section 204 comprises a generally cylindrical sleeve 226 and a generally cylindrical central member 228 axially disposed in and extending substantially the length of sleeve 226. Central member 228 thus defines an annular chamber 230 in sleeve 226. The upper end of sleeve 226 is closed with end plug 232 which protrudes from the top of sleeve 226 and has an externally threaded extension 234. An axial passage 236 extends through end plug 232. The lower end of sleeve 226 is closed with end plug 238, positioned in the sleeve above the lower edge. End plug 238 has an axial passage 240 and a threaded aperture 242. A rubber seal 224 is provided in sleeve 226 below end plug 238.

Base section 206 comprises a generally cylindrical sleeve 244 and a generally cylindrical central member 246 axially disposed in and extending substantially the length of sleeve 244. Central member 246 thus defines an annular chamber 248 and sleeve 244. The upper end of sleeve 244 is closed with end plug 250 which protrudes from the top of sleeve 244 and has an externally threaded extension 252. An axial passage 254 extends through end plug 250. The lower of sleeve 244 is closed with end plug 256, joined to sleeve 244 as by welds 264.

It is preferred that end plug 256 have two opposing inlet ports 258 and 260, for the separate introduction of components of a hardenable binder into rockbolt 200. Suitable binders were discussed previously. Ports 258 and 260 extend inwardly and communicate with passage 262, which communicates with annular chamber 248. A separate mixing device is preferably provided inside base section 206 to ensure complete and early mixing of the binder. This mixing device can be a baffled unit in sleeve 244 before central member 246, or as described above and shown, can comprise a plastic or wire mesh 249 disposed in the lower part of chamber 248 and secured for example with a band 251 to central member 246.

Sleeve 208, 226 and 244 are all sized as described for sleeve 24 of rockbolt 20, and are constructed from the same material. As also discussed above, the external and/or internal sides of sleeves 208 226, and 244 can be provided with a rough surface to facilitate engagement with the binder material, especially if a grout or polyester binder is used. Similarly, central members 210, 228, and 246 are all made from the same material as described above with regard to central member 26 of rockbolt 20, except that the ends of central members 210, 228, and 246 are beveled so that they cannot block the inlets or outlets at either ends of sleeves 208, 226, and 244. The sections can be fit together as they are inserted into the bore to create a long rockbolt that the low roof would not normally permit. Top section 202 is inserted into bore 22 and the top of extension section 204 is secured to the bottom of top section 202 by threading extension 234 on end plug 232 into aperture 222 and end plug 218. Extension section 204 is inserted in bore 22 and base section 206 is secured to the bottom of extension section 204 by threading extension 252 on end plug 250 into aperture 242 in end plug 238. Base section 206 is then inserted into the bore. A face plate engages the roof surface 46 and has a hole 48 through which rockbolt 200 extends. A shoulder 264 formed at the juncture of sleeve 244 and end plug 256 engages the face plate.

Rockbolt 200 is installed in the bore. End plug 256 has a knob 263 of square cross-section depending from it for turning rockbolt 200 to operate an expandable anchor on the top of the rockbolt, as described previously for rockbolt 20. Once installed in the bore, rockbolt 200 is charged with binder material in the same manner as rockbolt 20. Installer unit 100 is fit over the end plug 256 and the handles 134 and 136 are operated to engage nipples 114 and 120 into ports 258 and 260, respectively. Once the nipples are properly secured in these ports, the source of binder components is actuated. The separate binder components enter separately through ports 258 and 260, and travel together through passage 262 into annular chamber 248 in base section 206. The binder travels upwardly through annular chamber 248 through axial passage 254 in end plug 250 and through axial passage 240 in end plug 238 and into annular chamber 230 in extension member 204. The binder material travels upwardly in annular chamber 230 and through axial passage 236 in end plug 232 and through axial passage 220 in end plug 218 into annular chamber 212 in top section 202. The binder travels upwardly in annular chamber 212 and out ports 216. Seal 217 prevents upward travel of the binder and the binder travels downwardly in the annular space between rockbolt 200 and bore 22.

It is apparent that for a shorter bolt the extension member can be omitted and the top section and base section connected directly or for a longer bolt additional extension sections can be interposed between the top section and base section.

A third embodiment of the rockbolt is indicated as 300 in FIG. 7. Rockbolt 300 is substantially similar to rockbolt 20. Rockbolt 300 comprises a generally cylindrical, at least somewhat flexible sleeve 302 and a flexible central member 304, axially disposed in and extending substantially the length of sleeve 302. Central member 304 is preferably a metal cable or wire rope. Central member 304 thus defines an annular chamber 306 in sleeve 302.

The lower end of sleeve 302 is closed with end plug 308. It is preferred that end plug 308 have two inlet ports 310 and 312 for the separate introduction of components of a hardenable binder into rockbolt 300. Suitable binders are discussed previously. As shown in FIG. 8, ports 310 and 312 extend inwardly and communicate with annular chamber 306. A separate mixing device is preferably provided in annular chamber 306 to ensure complete and early mixing of the binder. This mixing device can comprise a plastic or metal mesh 307 disposed in the lower part of chamber 304 and secured, for example with a band 309 to central member 304.

A face plate engages the roof surface 46 and has a hole through which sleeve 302 can pass. A shoulder 314 formed at the juncture of sleeve 302 and end plug 308 engages the face plate.

The upper end of sleeve 302 is closed with end plug 316. A portion 317 of central member 304, which is preferably a wire cable, may extend through end plug 316. Any of the various mechanical anchors known in the art, especially those adapted for cable bolts, can be mounted in portion 317 so that the upper end of rockbolt 300 can be engaged to the surrounding rock. Four ports 318 are provided in the sidewall sleeves 302, near the upper end and are equally spaced about the circumference of sleeve 302. A seal, such as dish-like seal 320, is mounted on sleeve 302 above ports 318. Seal 320 is like seal 56 described above.

Rockbolt 300 is charged with hardenable binder much like rockbolts 20 and rockbolt 200. The installer unit 100 is mounted over end plug 308 and handles 134 and 136 are operated to engage nipples 114 and 120 into ports 310 and 312, respectively. Once nipples 114 and 120 are secured in the ports, the source of the binder components is actuated. The separate components enter separately through ports 310 and 312 and travel together upwardly through annular chamber 306, the twisting configuration of central member 304 augmenting the mixing of the components and providing a more secure engagement with the binder. The binder travels out from ports 318, seal 320 preventing upward travel. The binder travels downward in the annular space between sleeve 302 and bore 22. The appearance of binder at the mouth of bore 24 indicates that the bolt is operated properly and rockbolt 300 is encased in binder. This binder hardens and secures rockbolt 300 in bore 22, and central member 304 in sleeve 302.

There are various changes and modifications which may be made to applicants' invention as would be apparent to those skilled in the art. However, any of these changes or modifications are included in the teaching of applicants' disclosure and they intend that their invention be limited only by the scope of the claims appended hereto.

We claim:

1. A rockbolt for installation in a bore in the roof of an underground excavation to support the roof, comprising:
   a sleeve for permanent installation in the bore in the roof, the sleeve having an upper and a lower end and having means only in the upper end of the sleeve for defining at least one outlet port in the sleeve;
   a central member axially disposed in, and extending substantially the length of the sleeve, and defining an annular chamber in the sleeve;
   means for introducing binder material into the annular chamber in the sleeve near the lower end, the binder material traveling upwardly in the annular chamber, out the ports in the upper end of the sleeve, and downwardly between the sleeve and the bore wall;
   means for engaging the sleeve near the lower end to the roof face;
   means for engaging the sleeve near the upper end to the rock surrounding the bore; and
   means for tensioning the rockbolt to compress the rock between the upper and lower ends.

2. The rockbolt of claim 1 wherein the means for engaging the sleeve near the upper end to the surrounding rock comprises an expandable anchor on the top of the sleeve.

3. The rockbolt of claim 1 further comprising a seal above the port, said seal engaging the surrounding rock when the rockbolt is installed in the bore and preventing upward travel of the binder material upon the extrusion of binder from the sleeve.

4. The rockbolt of claim 1 wherein the sleeve and the central member are flexible.

5. The rockbolt of claim 4 wherein the central member is made from a wire rope.

6. A rockbolt for installation in a bore in the roof of an underground excavation to support the roof, comprising:
   a sleeve for permanent installation in the bore in the roof, the sleeve having an upper and a lower end and having means only in the upper end of the sleeve for defining at least one outlet port in the sleeve;

a central member axially disposed in, and extending substantially the length of the sleeve, and defining an annular chamber in the sleeve;

means for introducing binder material into the annular chamber in the sleeve near the lower end, the binder material traveling upwardly in the annular chamber, out the ports in the upper end of the sleeve, and downwardly between the sleeve and the bore wall; said means for introducing the binder into the sleeve comprising: a second sleeve having an upper and lower end; a central member axially disposed in, and extending substantially the length of the second sleeve defining an annular chamber in the second sleeve; means for engaging the upper end of the second sleeve to the lower end of the sleeve with the annular chambers of the sleeve and second sleeve in communication; and means for introducing binder material into the annular chamber of the second sleeve.

7. A rockbolt for installation in a bore in the roof of an underground excavation to support the roof, comprising:

a top section comprising a sleeve having an upper and a lower end, a central member axially disposed in the sleeve and extending substantially the length of the top section and defining an annular chamber in the top section, and at least one outlet port in the sleeve only in the upper end;

a base section comprising a sleeve having an upper and lower end, a central member axially disposed in the sleeve and extending substantially the length of the base section and defining an annular chamber in the base section, and means for introducing binder material into the annular chamber in the base section, and means for engaging the lower end of the top section and the upper end of the base section with the annular chambers in the top section and base section communicating.

8. The rockbolt of claim 7 wherein the means for engaging the top section and base section comprises a male end having a projecting portion on one of the section ends and a female end having an opening for receiving the projecting portion of the male and on the other section end, a seal interposed between the male and female ends, an axial passage in the projecting portion of the male end, and an axial passage in the female end positioned to be aligned with the axial passage in the male end, and means for securing the two ends together.

9. The rockbolt of claim 7 wherein the means for engaging the top section and base section comprises at least one extension section interposed between the top and base section, the extension section comprising:

a sleeve with an upper and lower end, a central member axially disposed in the sleeve and extending substantially the length of the extension section and defining an annular chamber in the extension section, and means for engaging the upper end of the extension section to the lower end of the section above it with their annular chambers communicating, and means for engaging the lower end of the extension section to the upper end of the section below it, with their annular chambers communicating.

10. A method for supporting the roof of an underground excavation, comprising:

making a bore in the roof of the excavation;

permanently inserting into the bore a sleeve having an upper and lower end and means for defining at least one outlet port only in the upper end of the sleeve, the sleeve containing a central member axially disposed in, and extending substantially the length of, the sleeve and defining an annular chamber in the sleeve; the sleeve further comprising means for engaging the upper end to the rock around the bore and means for engaging the lower end to the roof face;

injecting binder into the sleeve, forcing the binder upwardly in the annular chamber, out the port in the upper end of the sleeve, and down the space between the sleeve and the bore to secure the sleeve in the bore; and tensioning the sleeve to compress the rock between its upper and lower ends, at any time before the binder sets.

11. The method of claim 10 wherein the binder is injected into the sleeve as separate components that mix as they move up in the annular chamber.

12. A method for supporting the roof of an underground excavation, comprising:

making a bore in the roof of the excavation;

permanently inserting into the bore a sleeve having an upper and lower end and means for defining at least one outlet port only in the upper end of the sleeve, the sleeve containing a central member axially disposed in, and extending substantially the length of, the sleeve and defining an annular chamber in the sleeve;

connecting in series with the sleeve, and inserting in the bore, at least one extension sleeve having upper and lower ends and containing a central member axially disposed in and extending substantially the length of the extension sleeve, and defining an annular chamber in the extension sleeve, the connection made such that the annular chambers of adjacent sections communicate;

injecting binder into the sleeve, forcing the binder upwardly in the annular chamber, out the port in the upper end of the sleeve, and down the space between the sleeve and the bore to secure the sleeve in the bore.

* * * * *